US010503712B2

United States Patent
Nagaraja et al.

(10) Patent No.: US 10,503,712 B2
(45) Date of Patent: Dec. 10, 2019

(54) CONTAINER REPOSITORY OPTIMIZATION

(71) Applicant: International Business Machines Corporation, Armonk, NY (US)

(72) Inventors: Pavan P. Nagaraja, Bangalore (IN); Rajat R. Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 15/281,739

(22) Filed: Sep. 30, 2016

(65) Prior Publication Data

US 2018/0096002 A1 Apr. 5, 2018

(51) Int. Cl.
*G06F 7/00* (2006.01)
*G06F 17/30* (2006.01)
*G06F 16/215* (2019.01)
*G06F 16/22* (2019.01)
*G06F 16/13* (2019.01)
*G06F 16/11* (2019.01)

(52) U.S. Cl.
CPC .......... *G06F 16/215* (2019.01); *G06F 16/113* (2019.01); *G06F 16/13* (2019.01); *G06F 16/22* (2019.01)

(58) Field of Classification Search
CPC ......... G06F 17/30303; G06F 17/30312; G06F 17/30598; G06F 16/215; G06F 16/22; G06F 16/13; G06F 16/113
See application file for complete search history.

(56) References Cited

U.S. PATENT DOCUMENTS

| 9,223,546 | B1 | 12/2015 | Chaffin | |
|---|---|---|---|---|
| 9,256,454 | B2 | 2/2016 | Bell et al. | |
| 9,928,059 | B1* | 3/2018 | Sartor | G06F 8/71 |
| 2006/0092861 | A1* | 5/2006 | Corday | H04L 41/0213 |
| | | | | 370/256 |
| 2006/0150178 | A1* | 7/2006 | Jerrard-Dunne | G06F 8/71 |
| | | | | 717/168 |
| 2009/0222433 | A1* | 9/2009 | Mattox | G06F 17/30598 |
| 2012/0303583 | A1* | 11/2012 | Chowdhry | G06F 11/1451 |
| | | | | 707/640 |
| 2013/0227532 | A1 | 8/2013 | Choi | |
| 2016/0366016 | A1* | 12/2016 | Cors | H04L 41/0806 |

OTHER PUBLICATIONS

IBM Document, "Patent Applications to be Listed as Related," for Examiner's Eyes Only, pp. 1-2.

\* cited by examiner

*Primary Examiner* — Md I Uddin
(74) *Attorney, Agent, or Firm* — Brian J. Colandreo, Esq.; Jeffrey T. Placker, Esq.; Holland & Knight LLP

(57) ABSTRACT

An application component contained in a template is identified. The repository is scanned to determine whether the application component identified from the template is preexisting in the repository. In response to a determination that the identified application component is preexisting, the identified application component is removed before the template is saved in the repository and in response to a determination that the identified application component is not preexisting, the identified application component is posted in the repository.

12 Claims, 5 Drawing Sheets

CONTAINER REPOSITORY OPTIMIZATION

TECHNICAL FIELD

The present invention generally relates to a repository having container applications. More particularly, the invention describes optimization of components saved on the repository and building a new container application from the saved components.

BACKGROUND

In general, a container application shares kernel with other container applications, though each application runs as an isolated process in a host device. Container applications are used frequently, as these are not tied to any specific infrastructure. They run on any computer, on any infrastructure, and in any environment, such as cloud. The container application is built using at least one application components.

Packaging the container application, as a bundle, in the template along with configs and dependencies corresponding to each of the application components required, guarantees that the container application will always work as designed in any environment, whether locally, on another machine, in test or production.

The template includes for each application component, a binary file which is an image. The one or more images interact with one another to launch the container application. The template file containing images can be shared across other applications or devices. A host device saves these images corresponding to a container application unless deleted by the host device. Also the host device may save the received template on a repository.

SUMMARY

According to an implementation, a computer-implemented method may include identifying an application component contained in a template. The method may also include scanning a repository to determine whether the application component identified from the template is preexisting in the repository. The method may also include in response to a determination that the identified application component is preexisting, removing the identified application component before the template is saved in the repository. The method may further include in response to a determination that the identified application component is not preexisting, posting the identified application component in the repository.

According to another implementation, a computer program product includes a non-transitory computer readable storage medium having program instructions embodied therewith. The program instructions are readable by a processor to cause the processor to perform a method including identifying an application component contained in a template. The method may also include scanning a repository to determine whether the application component identified from the template is preexisting in the repository. The method may also include in response to a determination that the identified application component is preexisting, removing the identified application component before the template is saved in the repository. The method may further include in response to a determination that the identified application component is not preexisting, posting the identified application component in the repository.

According to yet another implementation, a computer system includes one or more computer processors and one or more computer readable storage media. The system also includes program instructions stored on the computer readable storage media for execution by at least one of the one or more processors. The program instructions may cause the at least one processor to perform a method including identifying an application component contained in a template. The method may also include scanning a repository to determine whether the application component identified from the template is preexisting in the repository. The method may also include in response to a determination that the identified application component is preexisting, removing the identified application component before the template is saved in the repository. The method may further include in response to a determination that the identified application component is not preexisting, posting the identified application component in the repository.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure. The various features of the drawings are illustrations for clarity and not to scale.

DETAILED DESCRIPTION

Figure 1:
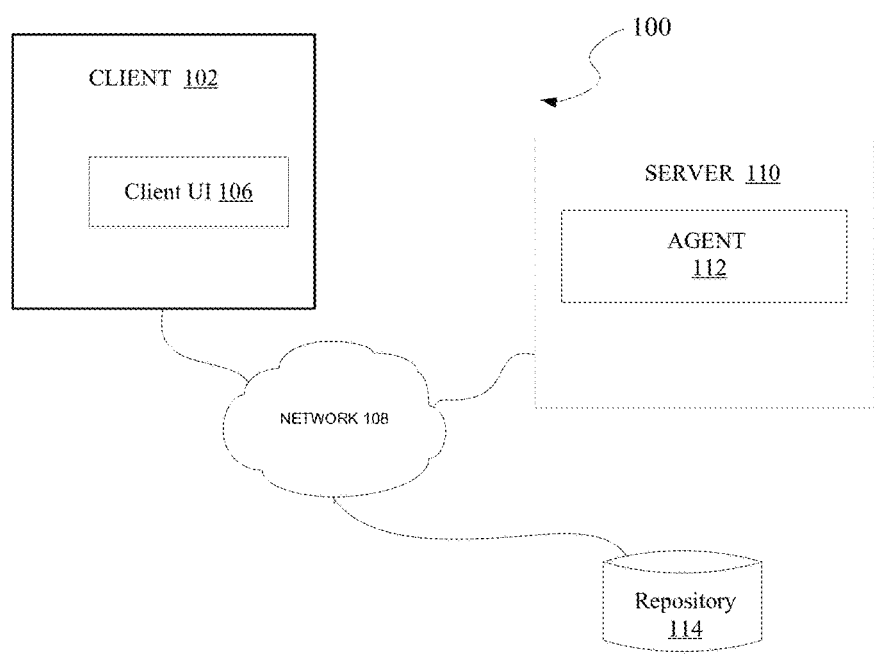
FIG. 1 illustrates an exemplary schematic structural diagram of an environment for repository optimization, according to one embodiment.

Terms such as template may be used interchangeably. Terms such as host device and server may be used interchangeably.

As several container applications may run on a host device in parallel, some of these may include application components that are common to other container applications. Such other container applications thus, carry duplicates of image files bundled in other templates. As a result, when other image file bundles corresponding to another (second) container application gets saved on the repository, the repository includes overlaps of images, which keep piling up. Therefore, besides running the container applications smoothly, the host device requires enough storage to save copies of the image bundles being received by it. Additionally, in some cases, despite saving these templates, a new application may still be built from scratch.

In an example embodiment, a method may provide for optimizing an existing repository comprising several self-contained templates, each identifying to a distinct container application, where, when an application component is identified as existing among other container applications or templates saved on the repository, the duplicate application component may be removed.

In another example embodiment, to prevent overload on repository by saving each of the templates as bundles, the present disclosure may provide a solution that creates a new section on the repository for effective saving of images one time for later use.

In yet another example embodiment, when a request to build a new container application is received, a method may provide a solution that enables scanning through the new section of the repository to identify applications components which are found to be pre-existing and pull such preexisting components to build the new container application on the fly.

Additional features will be set forth in the description which follows, and in part, will be apparent from the description, or may be learned by practice of the invention. For optimizing repository, an example method may include identifying an application component contained in a template; scanning a repository to determine whether the application component identified from the template is preexisting in the repository; in response to a determination that the identified application component is preexisting, removing the identified application component before the template is saved in the repository; and in response to a determination that the identified application component is not preexisting, posting the identified application component in the repository.

A host device may continue to preserve a new template on a repository and may fail to configure that each time the template is stockpiled, it may have duplicate application components which are preexisting in other templates already loaded on the repository. Exemplary embodiments of the present disclosure may provide a method and a system for effective optimization of repository. The method may allow saving of application components one time, irrespective of these being present across one or more templates. The solution may provide crawling through each of the templates having at least one of an application component, the application component may further include a bundle of images corresponding to the container application. The method may identify each of the distinct images and may upload those corresponding application components that are identified, to be not preexisting on the repository. The solution may further modify the existing template by replacing the application component with a corresponding address of a location where the image of the identified application component has been saved on the repository. The solution may thus, provide for effective storage utilization of the repository.

While the host device may be configured to run the container application based on the template saved on the repository, nevertheless, when a new container application is to be build, the host device may assemble the container application components from scratch. The host device may fail to configure that an input for the new container application, has a requirement of application components, that may be found in other container applications either running on the host device or saved in the repository. As a result, during the build process of a new container application, time may be invested, not only, to fetch each of the application components from a public library, but also, in testing compatibility of the pulled images of the application components. The host device may fail to configure that corresponding images saved on a local repository can be pulled and utilized to build a new container application, instead of fetching such application component from the public library.

Embodiments of the present disclosure may be additionally configured to separate each of the identified application components into base and auxiliary components and save them in separate sections created in the repository for later use.

Some example embodiments of the present disclosure will now be described in more detail with a reference to the accompanying drawings, in which the example embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art. Embodiments of the present disclosure will now be described in detail with reference to the FIGS. 1-5.

The container application may have several states: created, restarting, running, paused, or stopped. A created container application is the one which has not been started yet on the host device. A stopped container will retain changes to its settings, metadata and component files, including runtime configuration such as IP address that are not stored in images. After the container application has stopped running on the host device, it can be removed.

The container application may be built from application components which are collective set of component files, included in the template. The component files may further include commands and other services compiled together. During run up process, step by step instructions may be executed such that binary files corresponding to each of the listed application components interact with one another. Once all the instructions in the template are executed, a set of images may be created that make the container application function.

Each container application may have a unique identity and each of its unique images may be tagged for identification and may include other information such as version, API version, go version, commit, built, and OS for client and server. In one example, the image is defined as an immutable template, which does not have state. Each generated image has a distinct identity corresponding to the container application to maintain an association. Since, each of the container applications is unique that maps to the identified templates images, as a result, several container applications can run on the same host device independently of one another. Each of the container applications is self-contained, elusive of the content in other distinct container applications.

The host device may be configured to run one or more container applications simultaneously even when these are saved on the repository. Thus, each time the template is saved on the repository, the repository may include overlaps of the application components which are preexisting as duplicates in other container applications.

FIG. 1 is an example representation of a functional block diagram of a system illustrating a method for building a container application and repository optimization environment, in accordance with one embodiment of the present environment. The repository optimization environment 100 may include a server 110, a client 102, and a repository 114 connected with a network 108.

FIG. 1 illustrates a client 102. The client 102 may enable a user to send a request to the server 110. In one example, the input may be to launch the container application. In another embodiment, the request may be to save the template on the repository. In yet another example, the request may be to optimize an existing library. In another example, the request may be to generate the new container application on the fly, using application components saved locally on the repository. In one embodiment, the client 102 includes a user interface (UI) 106 which operates to receive user input from the user. In one embodiment, the UI 106 provides an interface that enables the user of the client 102 to interact with the server 110 via the network 108.

In one embodiment, the client 102 may include a client application (not shown) to communicate with the server 110. In some embodiments, the client application intermediates through the server 110 to communicate with a repository that includes a library (not shown). The library herein, refers to a registry or a public repository which is a location for information of all application components.

In some embodiments, UI 106 may be a part of the client application. The client application may receive output using display capabilities of the client 102 and/or client application. The output may be communicated in a variety of formats such as HTML, CSS and or JavaScript, or a variety of user interface technologies.

In various embodiments, the client 102 can be a laptop computer, a tablet computer, a netbook computer, a personal computer (PC), a desktop computer, a personal digital assistant (PDA), a smart phone, or any programmable electronic device capable of communicating with the server 110 via network 108. The client 102 may include internal and external hardware components, as depicted and described in further detail with respect to FIG. 5.

The request from the client 102 may be received and processed by the server 110. In various embodiments, the server 110 is a device that can be a standalone device, a server, a laptop computer, a tablet computer, a netbook computer, a personal computer (PC), or a desktop computer. In another embodiment, the server 110 represents a computing system configured to utilize clustered computers and components, such that they act as a single pool of seamless resources. In general, the server 110 can be any computing device or a combination of devices with access to the client 102 and with access to and/or capable of communicatively linked together over other devices through the network 108 (e.g., the Internet). In one example, the server 110 may be configured to allow building of container application, by fetching information which may require access to several locations. The server 110 may include internal and external hardware components, as depicted and described in further detail with respect to FIG. 5.

In one embodiment, the server 110 may perform as an Application programming interface (API). The server 110 may, in order to execute the request from client 102, be configured to build the container application from the scratch. In some embodiments, the server 110 may be configured to communicate with the repository 114 and fetch the desired information as required, and then launch the container application. The server 110 may be further configured to save the images corresponding to the template on the repository 114.

As can be seen from FIG. 1, the repository 114 may store information pertaining to container applications. The repository 114 may capture all data, settings, operating systems information etc. The repository 114 may additionally save the information including the metadata dictionary on data lineage, integrity and history of the several container applications being saved. In some examples, metadata dictionary is a record that maintains information about versions of each of the application components and template associated to the container application. The repository 114 may also save records of each of the templates corresponding to the container applications, which are running on the host device (server 110) as separate from those that have exited the host device (server 110). In some embodiments, the repository 114 may save new templates for later execution as container applications.

In FIG. 1, the repository 114 is indicated as a single unit, it may be combination of several repositories combined with one another (not shown). In some examples, the repository 114 has access to a global registry database that retains related components files associated with the application components for public consumption (not shown).

In some embodiments, the repository 114 may store information pertaining to application components as discreet units at more than one location, for example, some information may be saved locally and other information may have public access. In the repository 114, in one example, information can be saved in different sections within the single repository. In some embodiments, the repository 114 is a local repository. The repository 114 can either have private or public access.

The repository 114 may be visible to the user of the client device 102. In some embodiments, the data in the repository 114 can be read by one or more of the servers 110 and the client 102. In some embodiments, information about data saved in the repository 114 can be read by programs and entities inside and/or outside of the environment 100 in order to populate the repository with new data. In one example, the repository 114 is a hybrid database.

In some embodiments, the repository 114 may be stored on disk storage or in one or more accessible memory locations. When speed is a key performance metric, the repository 114 may have some portions stored in memory, while other portions of the repository may be stored on disk storage. In some embodiments, the repository 114 may have storage across multiple locations in a single server or distributed across several servers. In one example, the repository 114 may be part of the server 110 or may be located on cloud. The repository 114 may store physical data in one or more different formats. The functioning of repository 114, in context of present disclosure, is explained in further details in FIG. 3.

Network 108 can be, a local area network (LAN), a wide area network (WAN) such as the Internet, or a combination of the two, and may include wired, wireless, fiber optic or any other connection known in the art. In general, the network 108 can be any combination of connections and protocols that will support communications between the server 110, the client 102, the repository 114, in accordance with a desired embodiment of the present disclosure.

As indicated in FIG. 1, the server 110 further includes an agent 112. The agent may be a business intelligence tool that contains a software program which can perform one of the functions that includes optimization on an existing repository. In another embodiment, the agent can be an engine that performs the function of building a container application. In yet another embodiment, the agent 112 may be an application layer used to launch the container application on the fly by utilizing information related to one or more application components pre-existing on the repository 114.

In one example, the agent 112 may be a dedicated application running on the server 110, and may be able to natively to read requested input from the client device 102 and/or the server 110 and then configure the location of the one or more application components either running on the host device or stored in the repository and build the container application. In one example, the agent may be a component serving on the server 110 or yet in another embodiment, the agent may be an independent tool located on a host device, outside of the server 110 and communicatively coupled with the server 110 to perform multiple operations based on instructions received from the server 110. In yet one example embodiment, the agent 112 may be another server communicating with the server 110. In some embodiments, the agent 112 may be the application that may run on the client 102. In one embodiment, the agent 112 may be configured to communicate with the user through UI 106.

In some embodiments, the server 110 may be configured to communicate with the agent 112 to determine the possible steps required for building the container application. The agent 112 may read through the input received in the form of template and traverse through the repository to determine a location for fetching of identified application components, required to launch the container application. The agent 112 may be further configured to determine whether the application components as contained in the template are pre-existing in the repository.

In some embodiments, the agent 112 may be configured to crawl through the local repository 114 and determine which of the application components as contained in several templates and saved on the repository, are duplicates available in other templates. The agent 112 may perform the repository optimization process as depicted and explained in further detail with reference to FIGS. 2 and 3.

Figure 2:
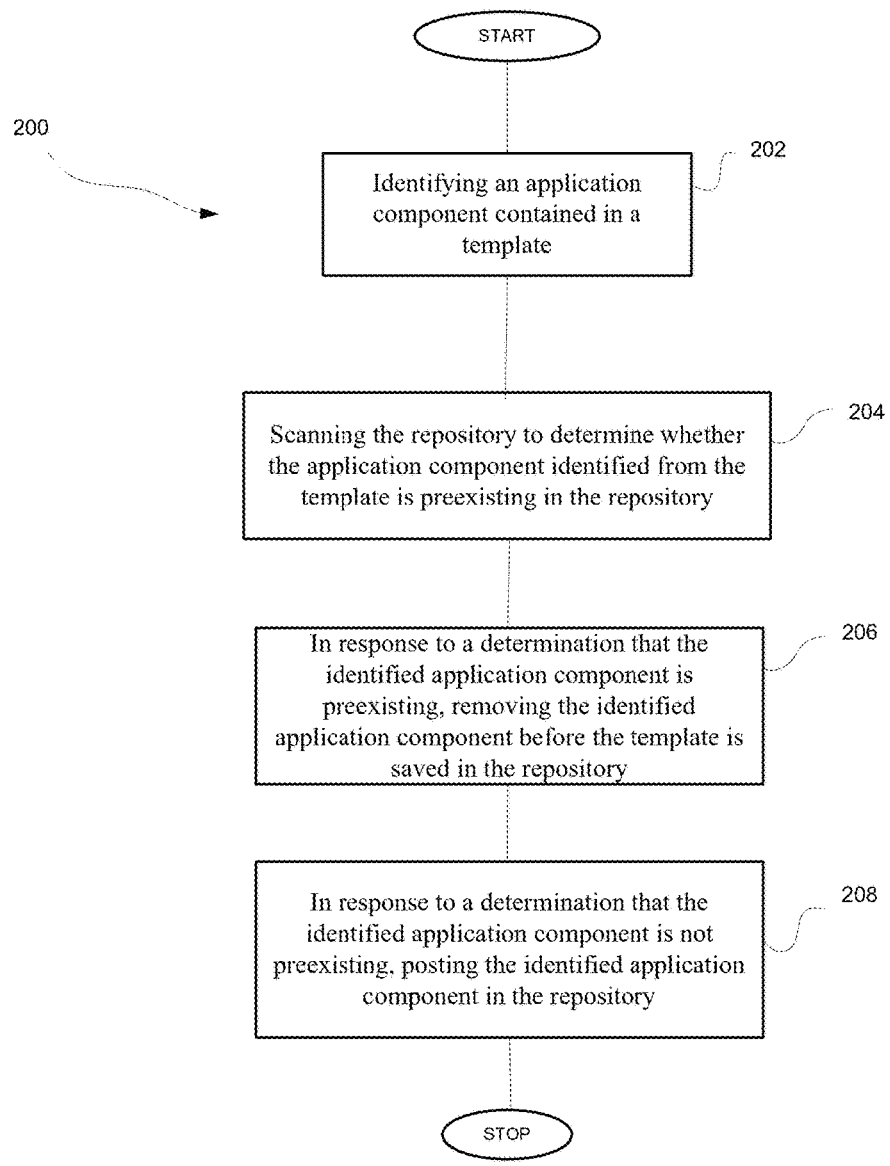
FIG. 2 illustrates an exemplary schematic flowchart depicting method for optimization of repository, according to one embodiment.

FIG. 2 is a flowchart depicting repository optimization operations, on a computing device within the environment 100 of FIG. 1, in accordance with an embodiment of the present disclosure. In one embodiment, the method may provide for isolating individual application components from the template and based upon a determination, that these are not pre-existing saves them in a new section of the existing repository 114. The method may provide for removing duplicate application components forming part of the template before saving the template on the repository 114. The method may provide for modifying the template by causing the removal of the associated application component, and replacing the removed application component with an information such as, an address from the repository, which is a location of a pre-existing version of the removed application component, before saving the template in the repository 114. When the corresponding container application is to be run, the method may run the container application by pulling the desired application components from various locations as mentioned in the template.

In another embodiment, the method may provide for building a new container application on the fly. The method may enable identification of pre-existing application components from the repository 114 and fetching them together to build the new container application.

In an example embodiment, the method for repository optimization may include the following operations: At 202, identifying an application component contained in a template. At 204, the repository is scanned to determine whether the application component identified from the template is preexisting in the repository. At 206, in response to a determination that the identified application component is preexisting, removing the identified application component before the template is saved in the repository and at 208, in response to a determination that the identified application component is not preexisting, posting the identified application component in the repository.

Figure 3:
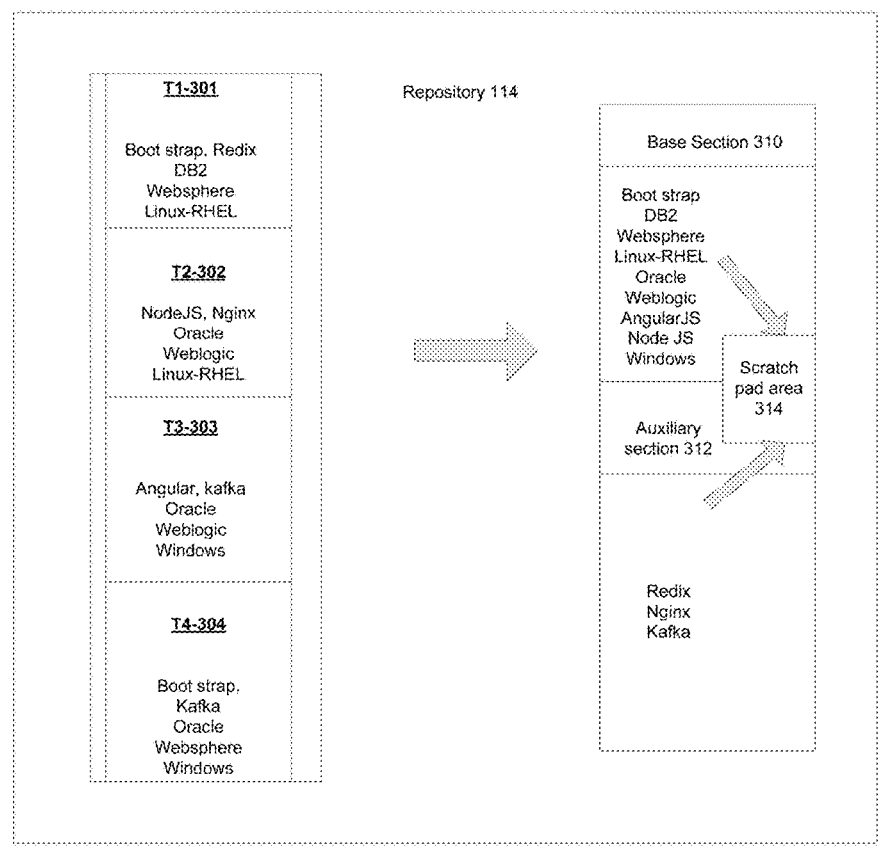
FIG. 3 illustrates an exemplary structural diagram of a repository, depicting creation of sections and saving of application components in respective sections, according to one embodiment.

At 202, there is identification of each of the application components contained within the template. The template may be either a new one brought for saving on the repository or may be pre-existing one. In one embodiment, where the function is to initiate the optimization operation, of the repository, the agent 112 is configured to determine, that besides saving the templates, whether there exists a separate section in the repository to save application components separately. Based upon a determination that there does not exist a separate section in the repository to save the application components distinctively from the templates containing them, the agent 112 may be configured to create a new separate section in the repository. Once the separate section is created in the repository, the agent 112 may be further configured to create compartments with the new section. The compartments with the new section may be identified as a base section and an auxiliary section, respectively. (as shown in FIG. 3)

In one embodiment, when the agent 112 executes the action of saving the template on the repository, the agent 112 may first identify a plurality of application components contained in the template. The agent may further segregate identified application components as either one of a base component and an auxiliary component to differentiate the identified application components. In one example, the agent 112 may use a config file to distinguish the base component and the auxiliary component.

The base component can be defined as stepping stone primary functionalities for building the container application. The base component may be identified as that application component which is the image that has no parent. Configurations of the base components varies for each container application depending upon the type of application build required. Components like Operating System, Database, Application Server, User Interfaces, core components of any application are examples. Similarly, auxiliary components may be identified as those which require a parent to work with. The auxiliary components may contribute to the existing functions of the base components. Functions of the auxiliary component may include enhancing performance, caching, UI modifications, creation of threads, efficient garbage collection.

The config file may store the metadata of the application components and also a location, from where the identified application components are to be or have been fetched. Based on the config file, the agent 112 can tag the application component as one of the base component or the auxiliary component. The agent 112 may be enabled to self-learn and keep it updated for reading the config file.

In one embodiment, the base and auxiliary application components are saved in isolation from the template, in the repository. The repository may save the identified application components in either the base section or the auxiliary section. Once the application components are saved distinctively on the repository, these can be used later, even when the template has been deleted from the repository or the container application has stopped running on the host device. The base section stores the identified base application components and the auxiliary section stores the identified auxiliary application components.

In one embodiment, the agent 112 is configured to save the metadata information related to identified application components based on the identification of the template. Since each template is identified by a unique identifier, the identifier corresponding to the template may be utilized to associate each of the application components of the template. In an example embodiment, tags are how various images in a repository are distinguished from each other. In one example, a tag is a label which associates an image of the application component in the template to the corresponding application component saved on the repository. Each of the application components within the template may use different tags. A new tag is added for every new image being saved on the repository. In some examples, each of the application components and the templates information is tagged to the location in the repository, where the isolated application components are being saved. In one example, an alphanumeric tag is attached to images within the repository.

At 204, corresponding to the template, the agent 112 may determine whether the identified application component is already saved in the repository. In one example, the agent 112 scans through the repository 114 to point out whether the identified application component in the template has a corresponding match, already saved in the repository 114. The agent 112 may be configured to identify whether there is an overlap of the given application component as contained in the template with the corresponding application component saved on the repository.

Further, as the given application component may have different versions, the agent 112 is configured to differentiate between application components based on the versions, they have. In some embodiments, the agent 112 is configured to compare the version of the application component with a corresponding version of the application component as saved on the repository. In one example, the agent 112 may be configured to utilize tags associated with the application component to compare with listed application component which are already pre-existing in the repository.

In some examples, wherein the application component is identified as base component, the agent 112 is configured to compare the base application component of the template with the corresponding base component as saved in the base component section of the repository 114. Likewise, when the application component is identified as the auxiliary application component, the agent 112 is configured to map the auxiliary application component of the template with the corresponding auxiliary component as saved in the auxiliary component section of the repository 114.

If the application component is pre-existing on the repository, it is termed 'as duplicate'. If the identified application component is not pre-existing on the repository, the application component is termed as 'unique'. The term 'unique' implies that the given application component is new when compared with other pre-existing application components saved on the repository 114 and will be posted to the repository. The given application component may be saved in the new section of the repository 114. (see FIG. 3)

At 206, based upon a determination that the identified application component is preexisting, the template's application component is removed before the template is saved in the repository. The agent may be configured to isolate the identified application components from the template to build the repository, such that the isolated application components can be utilized independently, irrespective of the association to the given template.

When the given application component from the template is determined to be preexisting in the repository 114, the application component may be termed as 'duplicate'. Instead of saving the identified 'duplicate' application component in the repository again, the agent 112 may be configured to perform two things. First, files associated to the duplicate application component may be automatically removed before template is saved on the repository. The agent 112 may also replace the removed application component in the template with a corresponding address in the repository which holds the same version. The template may be modified to include reference to a corresponding location of the preexisting application component, as identified by the agent 112, after scanning in the repository 114.

Second, metadata information pertaining to the removed application component from the template may be included in the corresponding section of the repository, for updating the repository with the information about the template being saved on the repository. The agent 112 may attach the unique identifier and tag corresponding from the given template, to the preexisting application component of the repository to build association between the template's application component and the repository. This function helps to prevent saving duplicates in the repository, time and again thus, reducing storage requirements. This may enable to compose the template even when it may have got deleted.

In some examples, the agent 112 may further communicate with the client 102 to notify about the identified duplicate application component saved prior in the repository and get confirmation from the user, before removing the duplicate application component. In one example, based on close versions association between versions, application components may be build.

In one example embodiment, through repository, application components of one template get linked to another template, such that when information in one application component gets updated, information contained in the other template also gets updated. This ensures that related images are kept in sync.

At 208, a determination may be made whether the identified application component is not preexisting. Based upon a determination that the identified application component is not preexisting, the identified application component termed as 'unique' may be posted in the repository 114.

Wherein the agent 112 configures that the identified application component as contained in the template does not have a copy in the repository 114, the agent 112 may store newly identified unique application component in the repository 114. The agent 112 may additionally save metadata information associated for the corresponding template, saved on the repository. In one embodiment, wherein the unique application component is identified as base application component, it gets saved in the base section of the repository 114. Wherein the unique identified application component is identified as auxiliary component, it gets saved in the auxiliary section of the repository 114.

As the created images corresponding to the application components may be uploaded to the repository, independent to their association to either the template or the container application, such images can be put to use for even building a container application. In one example, there is no need to build a new image corresponding to the application component from scratch, such existing images can be re-used. Saved application components can be downloaded from the repository, without the need to spend time in fetching from a global library (a location in the internet). In an example embodiment, the present disclosure provides for building the container application by utilizing one or more application components, which are preexisting on the repository. The present disclosure may enable rapid/on-the-fly container deployments by utilizing the base-components and the auxiliary components stored in the repository. In some examples, saved application components may be used as is, without further experimentation, as these are already tested and tried.

In some example embodiments, the server 110 may receive a request to build the new container application. User may provide build context in the form of template. The server 110 may communicate with the agent 112 during the build process to figure out source code which may be linked with one or more application components. For the new application build, in some embodiments, the agent 112 may be programmed to check and manage the execution of the application components. The Agent 112 may be capable of knowing image storage and distribution.

The agent 112 may be configured to scan the input as contained in the template to identify the application components. The agent 112 may be intelligent enough to identify base components and auxiliary components among the several components forming part of the template. In one example, for each of the application components, identity of the image may be established based on the config file. It is determined whether the image corresponding to the application component, is one of base component and/or auxiliary component as contained in the container application input.

Based upon the identification, it may be further configured whether the image is a new image. The answer to this may be based upon knowing, what is going to be source of image, who maintains that image. The agent scans for the identified image first in the local repository to determine whether there exists any overlap or duplicates with another application. The agent 112 may compare the version of the application component with the corresponding version saved on the repository.

Wherein it becomes known that the image has a copy preexisting on the repository, the image may be taken as existing and in case, it is found that the given image does not have a copy saved locally in the repository. Such an image may be termed as 'new image'.

In some embodiments, when the image is already preexisting on the repository, then for each image to be retrieved from the local repository, information such as a path to the image, repository name, directory, name of image, version tag, all can be specified, to trace a location of the template image in the repository.

The agent 112 may be further enabled to display the identified one or more of the distinctive application components on the client device. In one embodiment, the extracted components may be displayed on the UI screen of the user and viewed by him for his selection and verification.

Wherein it is determined by the agent 112 that the identified image is not already present on the host or repository, the agent may enable downloading from a registry.

Basically the contents of the template are a list like directory containing list of images to be utilized. The new container application may be configured by selecting or including components from the repository according to a user selection or according to the config file template.

Based on the template context, the application component images may be gathered up together on a scratch pad area. In one example, the scratch pad may be located in a repository. In another embodiment, the scratch pad may be another location in host device. The present disclosure thus, may provide technology that enables applications to be assembled quickly from application components and deployed on anything from laptops to servers and to the cloud.

In the build-up of the container application, the images which are found in the local repository may be pulled from their respective locations in the repository to the scratch pad area to glue them together. In one example, the config file as contained in the template may be used to glue one or more of the components together. Likewise, application components which are not preexisting in the local repository may also be downloaded from the locations as provided in the template and brought to the scratch pad area.

After, each of the application components have been glued at the scratch pad area, they are ready to be moved to other locations as a bundle.

The images which are either pulled from the local repository or another repository, may be gathered in the scratch pad area and may be pulled by the agent 112 or the server 110 for launching the new container application. Once the image is executed on the server, the container application may be run. Results of the running of the container application can be shown.

In one example embodiment, the downloaded images which are identified as new, are further copied in the repository.

In one example, information such as name of container application, template, name of image and name of repository are auto generated. In another example, this information is provided by a user. A unique ID of the image is generated. Unique ID may be installed to run the application container for automated build for the image. In one example, base image and its version is used. Base image may further include information such as IP address, name ID, resource limits. The image may be tagged into a named repository. In one example, tag is added to an existing image after commit or build. Once the image is uploaded into the repository, it can be shared with the world, which can download the image. Each new container application may be placed on the host device, monitored and updated.

Also, the information related to the template may be updated in the repository.

After the operations as discussed under FIGS. 1 and 2 are implemented, FIG. 3 shows an example outcome of the repository building.

The above embodiments and implementations may combine together and cross-reference, thereby resulting in more embodiments.

FIG. 3 is an example embodiment, showing a new section in the repository 114 which includes application components. The present disclosure may make effective optimization of the repository such that duplicates are not saved several times. This example is applicable for a repository having several templates and requires optimization. This example, is also a build up to new manner of saving templates (not shown).

L. H. S of the repository indicates a section that includes templates on the repository. On L. H. S, is an example of the repository 114, which includes four templates T1 (301), T2 (302), T3 (303) and T4 (304). Template T1 301 may include five application components namely, Bootstrap, Redix, DB2, Websphere and Linux-RHEL. Template T2 (302) may include five application components namely, NodeJS, Nginx, Oracle, Weblogic and Linux-RHEL. Likewise, Template T3 (303) may include five application components namely, Angular, Kafka, Oracle, Weblogic and Windows. Similarly, template T4 (304) may include Boot strap, Kafka, Oracle, websphere and Windows.

As can be noted, some of the application components under different templates are duplicated. For example, Bootstrap, Kafka, Weblogic, Oracle, Websphere and Windows.

RHS indicates optimization of the repository wherein a new separate section may be constructed in the repository. The separate section may save application components as distinct from the template. This independent existence of application components may enable their reuse. This separate section may be further compartmentalized into two sections namely, a base section 310 and an auxiliary section 312. The base section 312 may be to fill with base components isolated from existing templates saved on the repository 114, and the auxiliary section 312 may be to include auxiliary components utilized across different templates. While just names of the application components are indicated in FIG. 3, for the sake of brevity, however the new section may be configured to include complete metadata information for each of the application components, including identification of the templates of which such application components are part of (not shown).

Further, the templates may be provisioned to not retain the application component files as a bundle on the template. The template may be modified, after the identified application components are saved on the repository, and corresponding location of the saved application components from the saved repository may be updated in the template, before the template is saved on the repository (not shown). In one example, the template includes metadata information corresponding to the application components.

In one example, the new section of the repository 114 is traversed through, to determine whether any of the application components is preexisting in this section. Upon finding a cross match, the present disclosure may be configured to replace the application component in the template with a corresponding location from the section. Also, in parallel, the disclosure may provide for updating an existing data information of the preexisting application component in the repository with new information regarding identification of the template, of which this application component is additionally part of.

Also, upon a determination that the identified application component from the template does not have a cross match in the repository, the application component may be saved into the relevant section of the repository and metadata information and other details of the new application component may be saved into either of the base section 310 or auxiliary section 312, as the case may be. Having updated the repository 114 with the new information, the present disclosure may now replace the application component with the address from the repository section, before saving the template in the repository. Thus, the template shall just have address of all the listed application components.

When the container application is to be launched on the host device, the present disclosure may be configured to fetch details corresponding to the identified application components from the repository 114 and then using the config file, glue them to run the container application.

Figure 4:
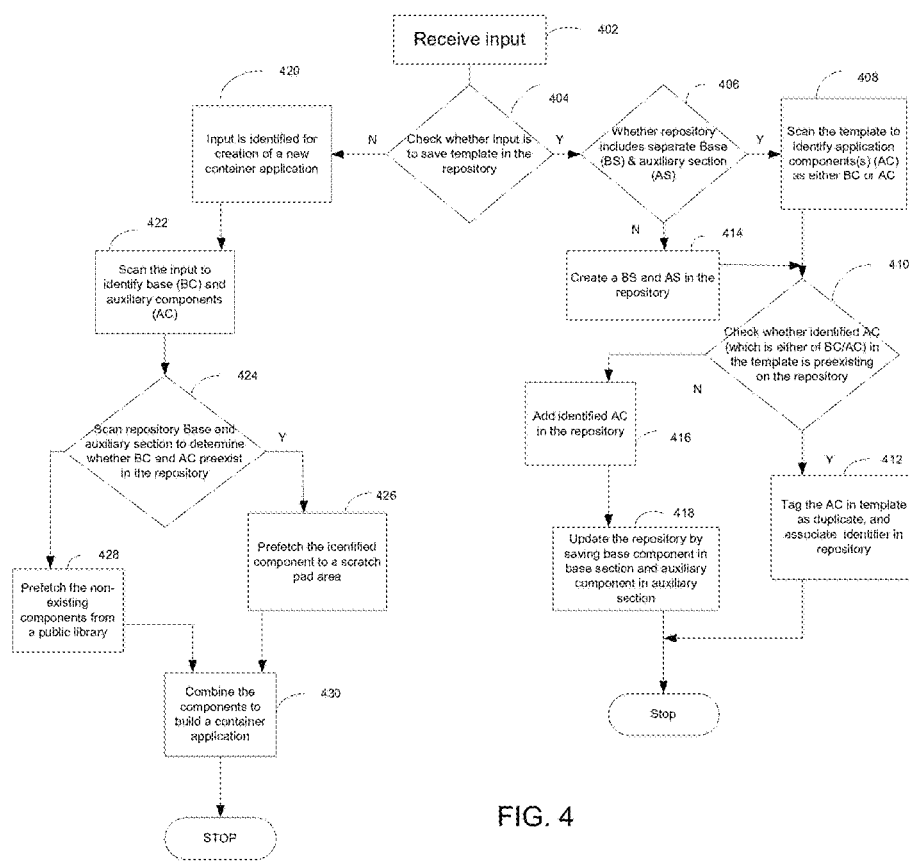
FIG. 4 illustrates an example process of lifecycle of building a container application, according to one embodiment.

Further, a mechanism may be provided that would enable re-using application components once saved on the local repository, while building up of the repository simultaneously. FIG. 4 is an example process of lifecycle of building a container application, according to one embodiment.

At 402: After an input is received. Move to step 404.

At 404: Analyze the input to determine, whether the input pertains to saving a template on the repository or for creation of a new build application. If it is determined that the input request is to save the template on the repository, move to 406, else move to 420.

At 406: determine whether the existing repository includes a new section which is further compartmentalized into a base section (BS) and an auxiliary section (AS), as explained in FIG. 3. Base section 312 is to keep identified base components (BC) and auxiliary section 314 is to maintain auxiliary components (AC). Wherein it is determined that the repository does not include a separate section in the repository, move to 414 to create the new section else move to 408.

At 414: wherein it is determined that the repository does not have a separate section that includes base section and auxiliary section, the agent 112 is configured to create a new section.

At 408: Scan the received template to identify each of the application components as one of a base component or an auxiliary component.

At 410: Compare the identified application component with a corresponding application components saved in the repository. In one embodiment, the base component of the application component is compared with a corresponding base component saved in the base section and the auxiliary component(s) of the template is compared with the corresponding auxiliary component(s), saved in the repository. Further, a version of the base component and the auxiliary component(s) of the application component in mapped with the corresponding version, saved in the repository. Wherein it is determined, that a duplicate is identified move to 412 else, move to 416.

At 412: Wherein the application component is identified, the application component is tagged as 'duplicate and from the template is not copied further into the repository. While the identified application component is removed before the template is saved in the repository, the location of the repository is modified in the template.

At 416: Wherein it is identified that identified application component is not pre-existing in the repository, complete details of the unique application component are copied onto the repository.

At 418: The identified application component is saved under respective compartments created in the section. Base component is copied to base section and auxiliary component is saved in auxiliary section.

At 420: Input is analyzed and determined for servicing a new container application.

At 422: Application component(s) within the input are further segregated as a base component and an auxiliary component(s).

At 424: Application component(s) are built by utilizing existing versions of one or more of the identified application components from the base section and the auxiliary section of the repository, respectively, if found. Wherein based upon mapping the input, the identified application components are found to be preexisting in the repository, move to 426 else move to 428.

At 426: Identified application components are retrieved from respective sections of the repository. In one example, these are brought together at a scratch pad area. In one example, these are glued with one another using a config file, details of the config file are enclosed in the received input.

At 428: Wherein the required application components are not preexisting, the agent 112 may be configured to direct to the public library, which has access to all applications. Agent 112 may be configured to retrieve such components from the library and bring them to the scratch pad area.

At 430: Components are combined to build the container application. Additionally, the components identified to be non-existing in the repository are updated into respective section of the repository for later use.

Later the application components may be bundled for transfer to the location where, a new container application can be launched. In one example, the bundle may be parceled to the end user for use.

In one example, the bundle may be saved to the repository for later use. In other example, the bundle is forwarded to the client device. The user may be provided with executable command to start the container application.

The various embodiments implementing the method have been described with respect to accompanying drawings. Those skilled in the art may understand that the method may be implemented in software, hardware or combinations of software and hardware. Moreover, those skilled in art may understand that by implementing various steps of the above method in software, hardware or combinations of software and hardware, there may be provided an environment 10 in which example embodiments of the inventive subject matter may be practiced as shown.

Figure 5:
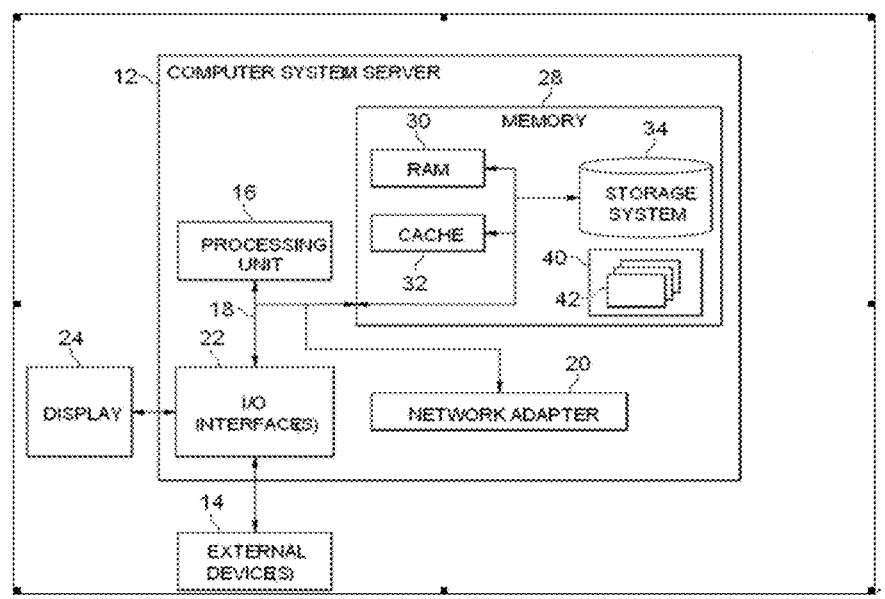
FIG. 5 illustrates a block diagram of an exemplary computer system/server which may be applicable to implement the embodiments.

Referring now to FIG. 5, in which a block diagram of an exemplary computer system/server 12 which is applicable to implement the embodiments of the present disclosure is shown. Computer system/server 12 shown in FIG. 5 is only illustrative and is not intended to suggest any limitation as to the scope of use or functionality of embodiments of the disclosure described herein.

As shown in the example of FIG. 5, computer system/server 12 is shown in the form of a general-purpose computing device. The components of computer system/server 12 may include, but are not limited to, one or more processors or processing units 16, a system memory 28, and a bus 18 that couples various system components including the system memory 28 and the processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Some example embodiments will be described in more detail with a reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A computer program product comprising a non-transitory computer readable storage medium having program instructions embodied therewith, the program instructions readable by a processor to cause the processor to perform a method comprising:

identifying an application component, of a plurality of application components, contained in a template, wherein each application component of the plurality of application components are distinguished from each other via a unique identifier, wherein the unique identifier includes a tag;

scanning a repository to determine whether the application component identified from the template is preexisting in the repository;

in response to a determination that the identified application component is preexisting, removing the identified application component before the template is saved in the repository, wherein removing the identified application component includes at least one of replacing the identified application component with a corresponding address from the repository related to the identified application component and updating a corresponding section of the repository with metadata information related to the identified application component, wherein the corresponding address and metadata information are saved to the tag associated with the identified application component; and in response to a determination that the identified application component is not preexisting, posting the identified application component in the repository, wherein the tag associated with the identified application component associates an image of the application component in the template to a corresponding application component saved on the repository;

receiving an input for servicing a new container application;

breaking the input into one or more application components, the application components further segregating as a base component and one or more auxiliary components;

extracting the corresponding preexisting versions of the segregated application components from the base section and the auxiliary section, respectively of the repository; and gluing the extracted versions of the application components respectively, from the repository on a scratch pad.

2. The computer program product of claim 1, wherein identifying the application component further includes segregating the application component into a base component and one or more auxiliary components based on a config file of the application component.

3. The computer program product of claim 2, wherein scanning the repository further comprises: comparing the base component of the application component with a corresponding base component and comparing the one or more auxiliary components of the application component with the corresponding one or more auxiliary component, respectively, saved in the repository.

4. The computer program product of claim 2, wherein in response to a determination that the identified application component is not preexisting, posting the identified application component in the repository, comprising:

determining whether the application components version is same as that of a corresponding existing version saved in the repository, and based on a determination that the two versions are different, pulling the identified not preexisting version of the base component and the one or more auxiliary component, respectively, of the application component, into a corresponding base section and an auxiliary section, created in the repository.

5. The computer program product of claim 4, further comprising: in response to receiving the input, building application components by utilizing existing versions of one or more of the application components from the base section and the auxiliary section of the repository.

6. The computer program product of claim 4, wherein in response to a determination that there are one or more of the base component and the one or more auxiliary components versions not found in the repository, fetching the identified non-existing versions from a library;

combining the non-existing versions fetched from the library with the base and the one or more auxiliary components versions of the application components extracted from the repository, respectively, on the scratch pad, for servicing the new container application; and updating the base section and the auxiliary section, respectively, of the repository, with the corresponding non-existing versions as fetched from the library.

7. A computer system:

one or more computer processors;

one or more computer readable storage media;

program instructions stored on the computer readable storage media for execution by at least one of the one or more processors, the program instructions causing the at least one processor to perform a method comprising:

identifying an application component, of a plurality of application components, contained in a template, wherein each application component of the plurality of application components are distinguished from each other via a unique identifier, wherein the unique identifier includes a tag;

scanning a repository to determine whether the application component identified from the template is preexisting in the repository;

in response to a determination that the identified application component is preexisting, removing the identified application component before the template is saved in the repository, wherein removing the identified application component includes at least one of replacing the identified application component with a corresponding address from the repository related to the identified application component and updating a corresponding section of the repository with metadata information related to the identified application component, wherein the corresponding address and metadata information are saved to the tag associated with the identified application component; and in response to a determination that the identified application component is not preexisting, posting the identified application component in the repository, wherein the tag associated with the identified application component associates an image of the application component in the template to a corresponding application component saved on the repository;

receiving an input for servicing a new container application;

breaking the input into application components, the application components further segregating as a base component and one or more auxiliary components;

extracting the corresponding preexisting versions of the segregated application components from the base section and the auxiliary section, respectively of the repository; and gluing the extracted versions of the application components respectively, from the repository on a scratch pad.

8. The computer system of claim 7, The computer program product of claim 1, wherein identifying the application component further includes segregating the application component into a base component and one or more auxiliary components based on a config file of the application component.

9. The computer system of claim 8, wherein scanning the repository further comprises: comparing the base component of the application component with a corresponding base component and comparing the one or more auxiliary components of the application component with the corresponding one or more auxiliary components, respectively, saved in the repository.

10. The computer system of claim 8, wherein in response to a determination that the identified application component is not preexisting, posting the identified application component in the repository, comprising:

determining whether the application components version is same as that of a corresponding existing version saved in the repository, and based on a determination that the two versions are different, pulling the identified not preexisting version of the base component and the one or more auxiliary components, respectively, of the application component, into a corresponding base section and an auxiliary section, created in the repository.

11. The computer system of claim 7, further comprising: in response to receiving the input, building application components by utilizing existing versions of one or more of the application components from the base section and the auxiliary section of the repository.

12. The computer system of claim 7, wherein in response to a determination that there are one or more of the base component and the one or more auxiliary components versions not found in the repository, fetching the identified non-existing versions from a library;
   combining the non-existing versions fetched from the library with the base and the one or more auxiliary components versions of the application components extracted from the repository, respectively, on the scratch pad, for servicing the new container application; and
   updating the base section and the auxiliary section, respectively, of the repository, with the corresponding non-existing versions as fetched from the library.

* * * * *